(12) United States Patent
Nilsson et al.

(10) Patent No.: US 7,184,791 B2
(45) Date of Patent: Feb. 27, 2007

(54) METHODS, RECEIVERS, AND COMPUTER PROGRAM PRODUCTS FOR DETERMINING TRANSMISSION POWER CONTROL COMMANDS USING BIASED INTERPRETATION

(75) Inventors: Johan Nilsson, Hollviken (SE); Elias Jonsson, Malmo (SE); Bo Bernhardsson, Lund (SE); Bengt Lindoff, Bjarred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 745 days.

(21) Appl. No.: 10/445,759

(22) Filed: May 27, 2003

(65) Prior Publication Data

US 2004/0058700 A1    Mar. 25, 2004

Related U.S. Application Data

(60) Provisional application No. 60/431,552, filed on Dec. 5, 2002, provisional application No. 60/412,898, filed on Sep. 23, 2002.

(51) Int. Cl.
   *H04B 7/00*    (2006.01)
   *H04Q 7/20*    (2006.01)

(52) U.S. Cl. ............... 455/522; 455/63.1; 455/69; 455/70; 455/127.5; 455/435.1; 455/452.1; 455/436; 455/550.1; 370/267; 370/318; 370/320; 370/331; 370/335; 370/342; 375/340; 375/347

(58) Field of Classification Search ............ 455/522, 455/63.1, 69, 70, 435.1, 452.1, 436, 439, 455/442, 550.1, 574; 370/267, 318, 320, 370/331, 335, 342; 375/227, 267, 340, 347
See application file for complete search history.

(56) References Cited

U.S. PATENT DOCUMENTS 5,569,367 A    10/1996    Betts et al. ............. 204/547

(Continued)

FOREIGN PATENT DOCUMENTS

DE           19903001 A1     8/2000

(Continued)

OTHER PUBLICATIONS

Grandell et al.; *Closed-Loop Control Algorithms in Soft Handover for WCDMA Systems*; IEEE No.: 0 7803-7097; 2001.

(Continued)

*Primary Examiner*—Matthew Anderson
*Assistant Examiner*—Shaima Q. Aminzay (57) ABSTRACT

Methods, receivers, and computer program products for defining asymmetric decision regions of a symbol space to interpret transmitted power control commands are disclosed. A method of determining transmitted power control commands at a receiver can include defining a first decision region of a symbol space associated with a first power control command at the receiver and a second decision region of the symbol space associated with a second power control command at the receiver where the first and second regions are asymmetric with one another. Methods of determining a transmitted power control command during soft handover mode in a wideband code division multiple access communications system are also discussed wherein a first determination of a combined power control command received from a plurality of transmitters can be combined with a second determination of the combined power control command received from the plurality of transmitters to provide a combined power control command. Related circuits are disclosed as well.

34 Claims, 4 Drawing Sheets

U.S. PATENT DOCUMENTS

| | | | |
|---|---|---|---|
| 5,878,350 A | 3/1999 | Nakamura et al. | 455/442 |
| 6,144,861 A | 11/2000 | Sundelin et al. | 455/522 |
| 6,166,622 A * | 12/2000 | Hosur et al. | 340/318 |
| 6,230,013 B1 | 5/2001 | Wallentin et al. | 455/436 |
| 6,330,456 B1 * | 12/2001 | Hashem et al. | 455/522 |
| 7,062,287 B2 * | 6/2006 | Nakamura et al. | 455/522 |

FOREIGN PATENT DOCUMENTS

| | | |
|---|---|---|
| EP | 1088592 A2 | 4/2001 |
| WO | WO 00/49728 | 8/2000 |
| WO | WO 01/14870 | 3/2001 |
| WO | WO 01/83113 A1 | 11/2001 |
| WO | WO 03/019813 A1 | 3/2003 |
| WO | WO 03/067783 A2 | 8/2003 |

OTHER PUBLICATIONS

U.S. Appl. No. 09/344,898; Filed: Jun. 25, 1999.
U.S. Appl. No. 09/344,899; Filed: Jun. 25, 2999.
International Search Report; PCT/EP 03/10026; Jan. 22, 2004.
International Search Report; PCT/EP 03/10026; Apr. 20, 2004.

* cited by examiner

METHODS, RECEIVERS, AND COMPUTER PROGRAM PRODUCTS FOR DETERMINING TRANSMISSION POWER CONTROL COMMANDS USING BIASED INTERPRETATION

CLAIM FOR PRIORITY

The present application claims priority from U.S. Provisional Application Ser. No. 60/412,898 to Nilsson et al., entitled "Improved TPC Decoding," filed Sep. 23, 2002, and from U.S. Provisional Application Ser. No. 60/431,552 to Jousson et al., entitled "Improved TPC Decoding in Soft Handover," filed Dec. 5, 2002, the entire contents of which are incorporated herein by reference.

TECHNICAL FIELD OF THE INVENTION

The present invention generally relates to the field of communications, and more particularly, to the field of wireless communications.

DESCRIPTION OF THE RELATED ART

Wireless communication systems are commonly employed to provide voice and data communications to subscribers. For example, cellular radio telephone systems, such as those designated AMPS, ETACS, NMT-450, GSM, and NMT-900, have long been deployed successfully throughout the world.

More recently, however, new wireless communication standards, including those developed under the Third Generation Partnership Project (3GPP) and other systems such as CDMA-2000, have been proposed using a format commonly referred to as Wideband Code Division Multiple Access (WCDMA). These specifications regulate, among other things, various aspects of how mobile user terminals, serviced by a compliant system, should operate. For example, 3GPP specifies the handling of Transmission Power Control (TPC) commands by the mobile user terminal. TPC commands, which can be transmitted from a base station to the mobile user terminal, specify whether the mobile user terminal receiving the TPC command should either increase or decrease its transmit power. The 3GPP specifies a time interval within which the mobile user terminal should adjust the transmit power after receiving the TPC command. Accordingly, the mobile user terminal should decode the TPC command and adjust the transmit power appropriately within the specified time interval to ensure proper operation of the mobile user terminal.

It is known that frequency errors between the mobile user terminal and the base station may cause the TPC commands received by the mobile user terminal to be misinterpreted. For example, frequency errors between the mobile user terminal and the base station can cause a command intended to increase the transmit power of the mobile user terminal (i.e., a TPC increase power command) to be misinterpreted as a command to decrease the transmit power of the mobile user terminal (i.e., a TPC decrease power command). Received TPC commands can also be misinterpreted due to, for example, interference or noise. If the transmit power of the mobile user terminal is mistakenly reduced such that the lower power limit needed to provide communications with the base station is not maintained, the mobile user terminal may lose service from the wireless communication system. On the other hand, if the transmit power is mistakenly increased there is a risk that the mobile terminal will transmit at a power level that will interfere substantially with other mobile terminals in the system, and affect the overall capacity. Transmission power control of mobile user terminals is discussed further, for example, in U.S. Pat. No. 6,343,218 to Kaneda et al. entitled Transmission Power Control Method, Mobile Phone, Base Station, and Recording Medium.

Moreover, the mobile user terminals can be in communication with more than one base station simultaneously during what is commonly referred to as "soft handover." For example, in a WCDMA system, a mobile user terminal may be in communication with up to 6 base stations during soft handover. Soft handover can improve the reliability of the communication between the system and the mobile user terminal when the terminal moves from one cell to another by reducing the probability that the call may be dropped. Further, soft handover may also increase the capacity of the WCDMA system since soft handover can provide increased diversity thereby compensating for phenomena such as fast fading.

In soft handover each base station can send independent Transmit Power Commands (TPC) in the down-link (i.e., from the base station to the mobile user terminal) that are used to adjust the power at which the mobile user terminal transmits in the up-link (i.e., from the mobile user terminal to the base station). For example, one base station may transmit a TPC command to increase the mobile user terminal's transmit power while another base station may transmit a TPC command to decrease the mobile user terminal's transmit power. The mobile user terminal, therefore, may need to adjust the transmit power in response to seemingly conflicting TPC commands.

Strategies for resolving different TPC commands from different base stations are known. For example, according to one strategy, if at least one base station transmits a TPC command to decrease the mobile user terminal transmit power, the transmit power of the mobile user terminal is decreased. However, the probability that the mobile user terminal receives the same TPC command that was transmitted by the base station can depend on the Signal to Interference Ratio (SIR) associated with the channel over which the commands are transmitted. Accordingly, the TPC command received (or interpreted) by the mobile user terminal may not be the same one transmitted by the base station. Typically Bit Error Rates (BER) associated with the transmission/reception of TPC commands can be about 5%–20%.

As the probability of the mobile user terminal misinterpreting a TPC command as a command to decrease the transmit power grows, so does the risk that the mobile user terminal will decrease the transmit power too much and loose the connection to the system. On the other hand, as the probability of the mobile user terminal misinterpreting a TPC command as a command to increase the transmit power grows, so does the risk that the mobile user terminal will increase the transmit power too much and affect the system's capacity.

SUMMARY

Embodiments according to the present invention can provide methods, receivers, and computer program products for defining asymmetric decision regions of a symbol space to interpret transmitted power control commands. Pursuant to these embodiments, a method of determining transmitted power control commands at a receiver can include defining a first decision region of a symbol space associated with a first power control command at the receiver and a second decision region of the symbol space associated with a second power control command at the receiver where the first and second regions are asymmetric with one another.

In some embodiments according to the present invention, a method can further include receiving a transmitted power control command at a receiver to provide a received symbol. It is determined whether the received symbol maps to the first decision region or to the second decision region. The received symbol is interpreted as the first power control command if the received symbol maps to the first decision region and interpreted as the second power control command if the received symbol maps to the second decision region. In some embodiments according to the present invention, frequency error information can be used to compensate for a frequency error between the transmitter and the receiver.

In some embodiments according to the present invention, methods of determining a transmitted power control command at a receiver during soft handover mode in a wideband code division multiple access communications system can include combining a first determination of a combined power control command received from a plurality of transmitters with a second determination of the combined power control command received from the plurality of transmitters to provide a combined power control command.

Embodiments according to the present invention may, therefore, allow a bias towards interpreting received power control commands as one type of command rather than another. For example, in some embodiments according to the present invention, a bias towards interpreting a received TPC command as a TPC power increase command, rather than as a TPC power decrease command, may reduce the possibility of the mobile user terminal mistakenly reducing its transmit power instead of increasing.

In some embodiments according to the present invention, a transmitted power control command can be received during soft handover mode in a wideband code division multiple access communications system by combining power control commands received from a plurality of transmitters based on a number of transmitters in communication with the receiver during the soft handover and a Signal to Interference Ratio (SIR) associated with a communications channel over which the receiver communicates during soft handover.

In some embodiments according to the present invention, the TPC commands can be received dulling soft handover mode by defining a first decision region of a symbol space associated with a first power control command at the receiver and a second decision region of the symbol space associated with a second power control command at the receiver, the first and second regions being asymmetric with one another. A first determination of a combined power control command received from the plurality of transmitter can be made. A second determination of the combined power control command received from the plurality of transmitters can be made. The first determination of the combined power control command can be combined with the second determination of the combined power control command to provide a combined power control command. A determination can be made as to whether the combined power control command is in the first decision region of the symbol space or in the second decision region of the symbol space to determine a value for the TPC command.

DETAILED DESCRIPTION OF EMBODIMENTS

The present invention will now be described more fully hereinafter with reference to the accompanying drawings, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

As will be appreciated by one of skill in the art, the present invention may be embodied as methods, mobile user terminals (such as a radiotelephone) and/or systems. Accordingly, the present invention may take the form of hardware embodiments, software embodiments or embodiments that combine software and hardware aspects.

The present invention is also disclosed using flowchart illustrations and block diagrams. It will be understood that each block (of the flowchart illustrations and block diagrams), and combinations of blocks, can be implemented using computer program instructions. These program instructions may be provided to a processor circuit(s) within the mobile user terminal or system, such that the instructions which execute on the processor circuit(s) create means for implementing the functions specified in the block or blocks. The computer program instructions may be executed by the processor circuit(s), such as a Digital Signal Baseband Processor, to cause a series of operational steps to be performed by the processor circuit(s) to produce a computer implemented process such that the instructions which execute on the processor circuit(s) provide steps for implementing the functions specified in the block or blocks. Accordingly, the blocks support combinations of means for performing the specified functions, combinations of steps for performing the specified functions and program instructions for performing the specified functions. It will also be understood that each block, and combinations of blocks, can be implemented by special purpose hardware-based systems which perform the specified functions or steps, or combinations of special purpose hardware and computer instructions.

The present invention is generally described herein in the context of a wireless Code Division Multiple Access (CDMA) and/or a Wideband Code Division Multiple Access (WCDMA) mobile user terminal. In such wireless communications systems, an antenna can radiate electromagnetic waveforms generated by a transmitter located, for example, in a mobile user terminal or a base station. The waveforms are propagated in a radio propagation environment, and are received by a receiver via one or more antennas.

CDMA systems, such as those conforming to the IS-95 standard, can provide increased channel capacity by using "spread spectrum" techniques wherein a channel is defined by modulating a data-modulated carrier signal by a unique spreading code, i.e., a code that spreads an original data-modulated carrier over a wide portion of the frequency spectrum in which the communications system operates.

As used herein, the term "WCDMA mobile user terminal" may include, any WCDMA communications device, specifically including, among other things, a single or dual mode cellular radiotelephone with or without a multi-line display; a Personal Communications System (PCS) terminal that may combine a cellular radiotelephone with data processing, facsimile and data communications capabilities; a Personal Data Assistant ("PDA") that can include a radiotelephone, pager, Internet/intranet access, Web browser, organizer, calendar and/or a global positioning system (GPS) receiver; and a conventional laptop and/or palmtop receiver or other appliance all of which include a radiotelephone transceiver which implements WCDMA type communications.

Figure 1A:
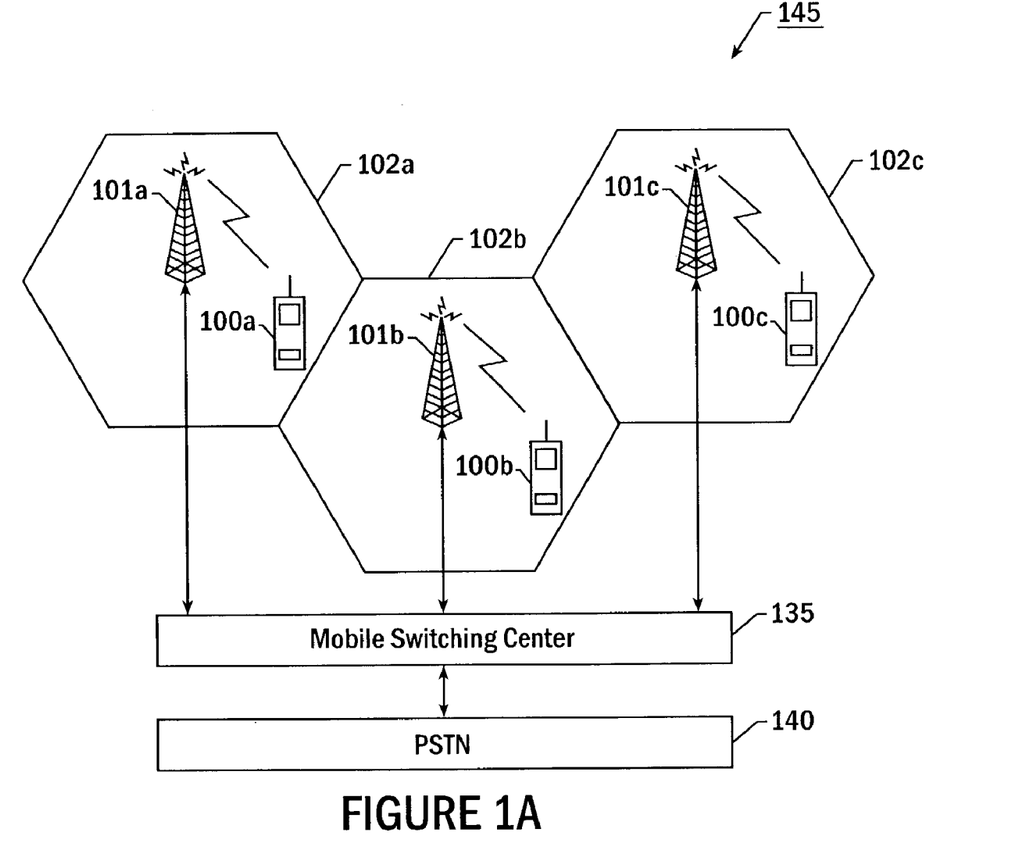
FIG. 1A is a block diagram illustrating wireless communication system embodiments according to the present invention.

FIG. 1A is a block diagram that illustrates wireless communication system embodiments according to the present invention. A WCDMA wireless communication system 145 provides wireless service to mobile user terminals 100a–c. The wireless communication system 145 is organized as a plurality of cells 102a–c each having associated base station(s) 101a–c which provide the wireless service to mobile user terminals 100a–c which happen to be located within the associated cell 102a–c at any particular time. The operation of the wireless communication system 145 is coordinated by a mobile switching center (MSC) 135 which is coupled to base stations 101a–c. The MSC 135 is further coupled to a Public Switched Telephone Network (PSTN) 140. It will be understood that more base stations 101a–c may be used in the wireless communication system 145 and that more than one base station can be associated with a cell. It will be further understood that more than one mobile user terminal 101a–c can be serviced by the cells 102a–c.

The wireless communication system 145 can maintain communications with the mobile user terminals 100a–c via multiple base stations 101a–c simultaneously to facilitate, for example, what is commonly referred to as "soft handover" when the mobile user terminal 100a–c is moved from one cell to another. As will be understood by those having skill in the alt, the wireless communication system 145 can maintain communication with the mobile user terminal 100a–c using what is commonly referred to as "transmit diversity mode." In transmit diversity mode, multiple antennas are used to transmit a signal from a base station to the mobile user terminal 100a–c.

As discussed above, the 3GPP specification calls for the transmission of transmission power control commands to the mobile user terminal 100a–c to regulate the power at which the mobile user terminal 100a–c transmits to the base station. For example, if the mobile user terminal 100a–c is distant from all of the base stations 101a–c with which it is communicating, each of the base stations may determine that the mobile user terminal 100a–c should increase the power at which it transmits to the base station. Therefore, each base station may transmit a "TPC power increase command" to the mobile user terminal 100a–c so that the mobile user terminal 100a–c increases its transmit power. Alternatively, if one or more of the base stations determine that the mobile user terminal 100a–c is transmitting at a power level which may cause interference with the operation of other mobile user terminals, or is otherwise unnecessarily high, those base stations can transmit "TPC power decrease commands" to the mobile user terminal 100a–c transmits, while the other base stations transmit "TPC power increase commands". In some situations, all base stations might transmit "TPC power increase commands".

In some embodiments according to the present invention, each of the base stations transmits TPC commands to the same mobile user terminal. Moreover, the TPC commands transmitted by different base stations can be different from one another. For example, some base stations may transmit a TPC power increase command because the signal received from the mobile user terminal is relatively weak, while other base stations may transmit a TPC power decrease command because the signal received at that base station is relatively strong.

Figure 1B:
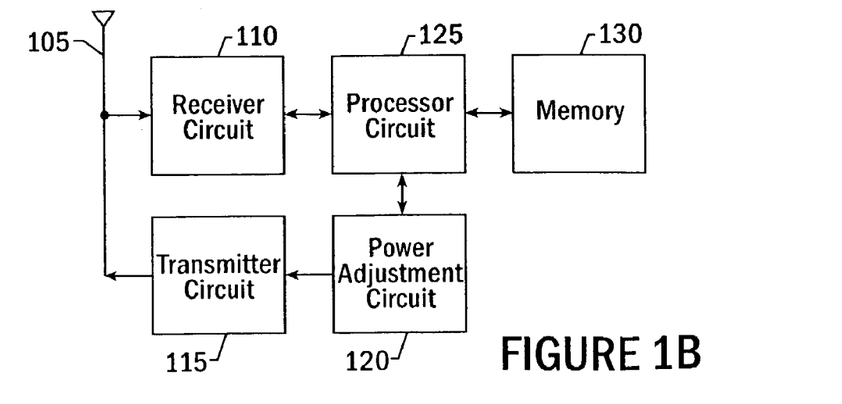
FIG. 1B is a block diagram illustrating a receiver and a transmitter included in mobile user terminal embodiments according to the present invention.

FIG. 1B is a block diagram illustrating a receiver and transmitter included in mobile user terminal embodiments according to the present invention. The mobile user terminal 100 receives commands transmitted by the wireless communication system 145 via an antenna 105 which is coupled to a receiver circuit 110. For example, the receiver circuit 110 receives the TPC commands transmitted by the wireless communication system 145 as discussed above. In some embodiments according to the present invention, the TPC commands can be transmitted in a downlink channel, such as a dedicated physical channel specified in the 3GPP specification, that is associated with the mobile user terminal 100.

As will be understood by those having skill in the art, signals associated with TPC commands are received by the receiver circuit 110 to provide "symbols" which can represent the TPC commands. The symbols can be a representation of the received command that includes data and associated information that indicates a level of confidence in the data. For example, the symbol can represent the received TPC command as a +1 or –1 and an associated confidence level that indicates the likelihood that the received TPC command is actually equal to the +1 or –1. The symbol can also be expressed as having separate components which can be the real and imaginary components of a vector.

It will be further understood that the TPC symbols may include multiple bits. For example, a TPC symbol may include two bits and, therefore, capable of representing fours states: –1–1, –1+1, +1–1, and +1+1. In some embodiments according to the present invention, two of the states, such as –1+1 and +1–1, are unused as only two states (power up and power down) are represented. It will be further understood that the TPC commands, in contrast to some other types of data transmitted by the wireless communication system, may not be error coded, which may allow for faster determination of the TPC command.

The TPC command produced by the receiver circuit 110 is provided to a power adjustment circuit 120 which is configured to adjust the transmit power of a transmitter circuit 115 used to communicate with the wireless communication system 145. The overall operation of the mobile user terminal 100 can be coordinated by a processor circuit 125 coupled to a memory circuit 130 which can store computer programs executed by the processor circuit 125 to carry out the steps described herein.

Figure 2:
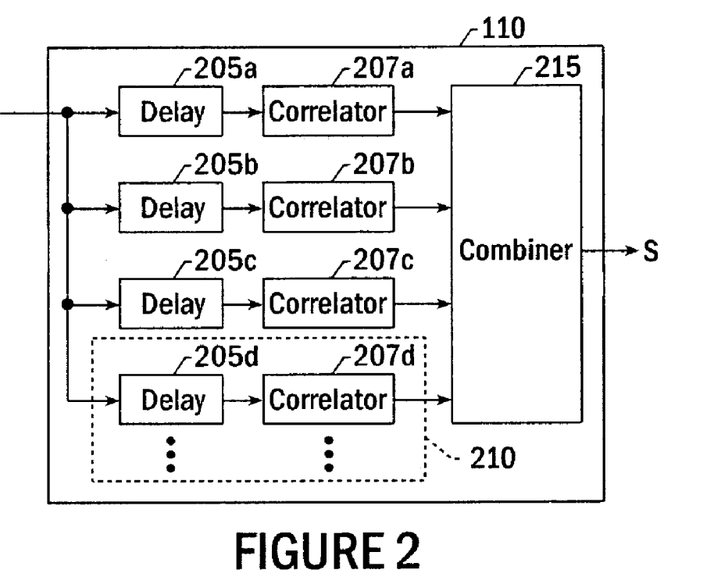
FIG. 2 is a block diagram illustrating rake receiver embodiments according to the present invention.

FIG. 2 is a block diagram which illustrates rake receiver embodiments according to the present invention. A so-called "rake receiver" can be used to recover information corresponding to one of the user data streams. In a typical rake receiver, a received composite signal is correlated with a particular spreading sequence assigned to the receiver to produce a plurality of time-offset correlations, a respective one of which corresponds to an echo of a transmitted spread spectrum signal. The correlations are then combined in a weighted fashion, i.e., respective correlations are multiplied by respective weighting factors and then summed to produce a decision statistic. Rake receivers are further described, for example, in U.S. patent application Ser. No. 09/344,899 filed Jun. 25, 1999 entitled Rake Combining Methods and Apparatus Using Weighting Factors Derived from Knowledge of Spread Spectrum Signal Characteristics, which is commonly assigned to the present assignee the disclosure of which is hereby incorporated herein by reference in its entirety. It will be understood that in some embodiments according to the present invention, the receiver circuit 110 can be another type of receiver rather than a rake receiver.

As will be understood by those having skill in the art, the rake receiver 110 in FIG. 2 can include a plurality of "rake fingers" 210. Each rake finger 210 can include a delay element 205a–d coupled to a correlator 207a–d, the outputs of which are coupled to a combiner 215. The combiner 215 can provide a TPC symbol which corresponds to the TPC command received by the mobile user terminal 100. It will be understood that embodiments according to the present invention can be used to receive commands other than TPC related commands.

Figure 3:
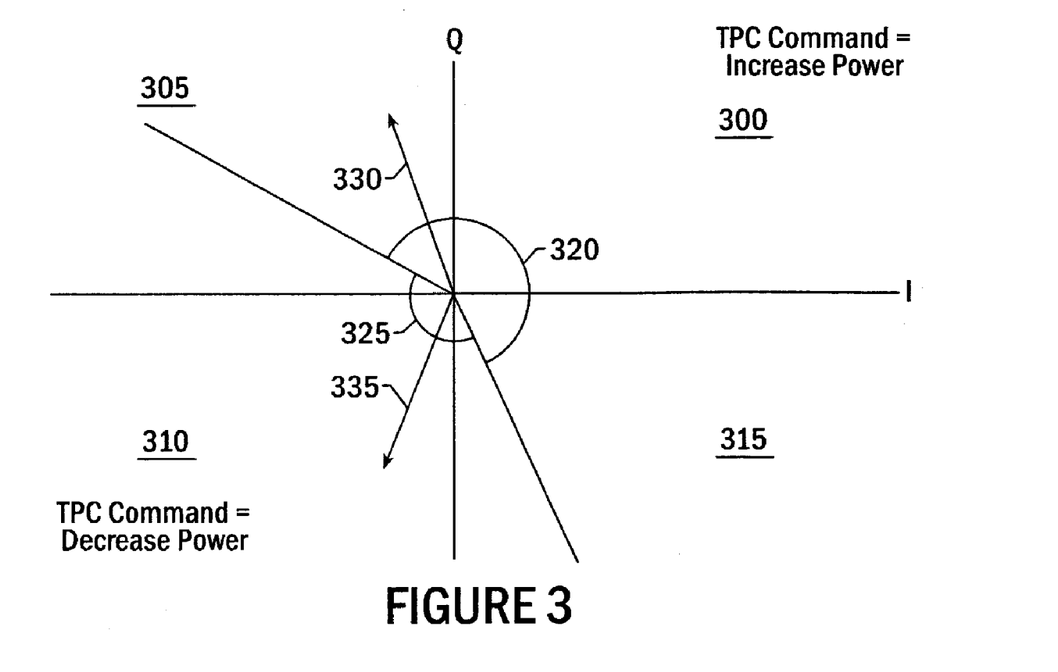
FIG. 3 is a schematic diagram illustrating a symbol space according to the present invention.

The TPC symbols can be mapped to a symbol space illustrated in FIG. 3. As shown in FIG. 3, the symbol space can be represented by a coordinate system "IQ" that is separated into four quadrants: 300, 305, 310, and 315. The symbol space is separated into two asymmetric decision regions: a first decision region designated by the arc 320 and a second decision region designated by the arc 325. In some embodiments according to the present invention, the first decision region 320 includes more than half of the signal space whereas the second decision region 325 includes less than half the signal space (i.e., the supplementary portion of the symbol space not included in the first decision region 320).

The asymmetric relationship between the first and second decision regions 320, 325 allows some symbols, which otherwise may be misinterpreted, to be mapped to the decision region associated with the TPC command for which a preference is shown. For example, the first decision region 320 can be associated with a TPC command to increase the transmit power of the mobile user terminal whereas the second decision region 325 can be associated with a second TPC command to decrease power of the mobile user terminal thereby providing a bias towards interpreting TPC commands as TPC power increase commands. For example, as shown in FIG. 3, the TPC symbol 330 maps to a portion of the symbol space included in the first decision region 320, and therefore, is interpreted as a TPC command to increase the transmit power of the mobile user terminal. In contrast, the TPC symbol 335 maps to the second decision region 325 of the symbol space and, therefore, is interpreted as a TPC command to decrease the transmit power of the mobile user terminal.

The first and second decision regions 320, 325 can be defined using two intersecting lines represented as follows:

$$k_1 I + k_2 Q = 0 \quad (1)$$

$$k_3 I + k_4 Q = 0 \quad (2)$$

where Q and I represent the real and imaginary components of the symbol in the IQ plane and where $k_1$, $k_2$, $k_3$, $k_4$ are positive values selected according to an allowed worst case frequency error, such as that specified by the 3GPP specification, and such that $k_1^2 + k_2^2 \approx 1$ and $k_3^2 + k_4^2 \approx 1$.

Figures 4, 5:
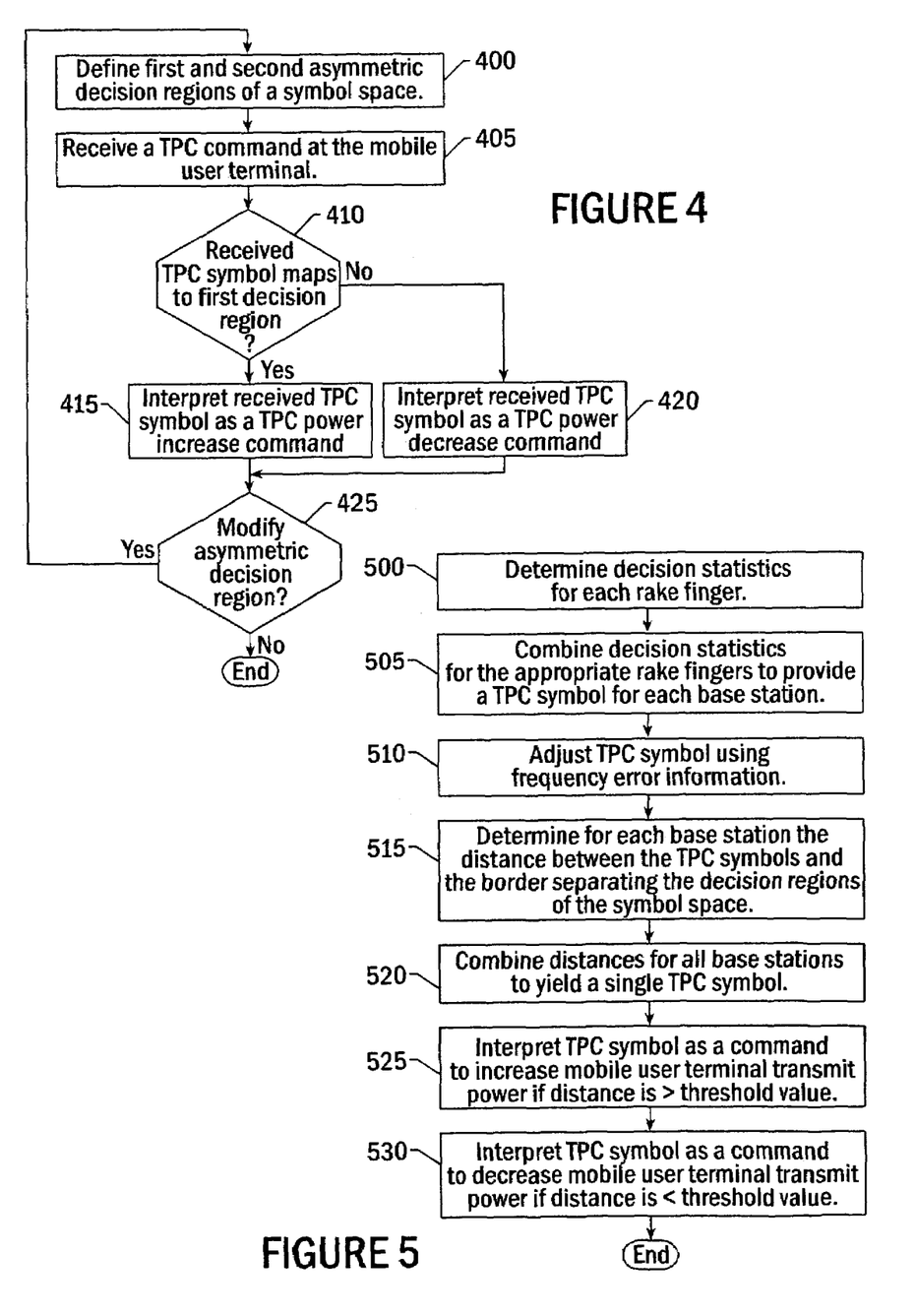
FIGS. 4–5 are flowcharts illustrating exemplary operations of embodiments according to the present invention.

FIG. 4 is a flowchart illustrating exemplary operations of mobile user terminal embodiments according to the present invention. According to FIG. 4, a first and second asymmetric decision regions of a symbol space are defined as discussed, for example, above (block 400). A TPC command is received at the mobile user terminal (block 405). The receiver produces a TPC symbol based on the command received by the mobile user terminal which is then mapped to the symbol space. If the TPC symbol maps to the first decision region (block 410), the TPC symbol is interpreted as a TPC command to increase the transmit power of the mobile user terminal (block 415). If, however, the TPC symbol maps to the second decision region of the symbol space (block 410), the TPC symbol is interpreted as a command to decrease the transmit power of the mobile user terminal (block 420).

In some embodiments according to the present invention, the definition of the first and second decision regions of the symbol space can be redefined as the mobile user terminal continues to operate (block 425). For example, the first and second decision regions can be redefined based on the number of base stations that transmit the TPC commands to the mobile user terminal, the velocity associated with the mobile user terminal, the interference experienced by the mobile user terminal, a frequency error between at least one of the base stations and the mobile user terminal, a pilot sequence received by the mobile user terminal or a parameter associated with transmission power that affects the reliability of the TPC commands. Accordingly, the first and second decision regions may be modified to adapt to a changing environment in which the mobile user terminal is used to thereby maintain the performance of the mobile user terminal and reduce the likelihood that a TPC command may be misinterpreted by the mobile user terminal even as the environment changes over time.

FIG. 5 is a flowchart that illustrates exemplary operations of mobile user terminal embodiments according to the present invention in further detail. According to FIG. 5, decisions statistics associated with the TPC commands received by the mobile user terminal are determined for each of the base stations in communication with the mobile user terminal (500). For example, the decision statistics provided by the rake fingers used to receive from a particular base station can be summed to provide a TPC symbol. The decision statistics, $d_{f,b}$ for RAKE finger f and base station b, can be determined based upon the following formula, if for example, the wireless communication system is operating in transmit diversity mode:

$$d_{f,b} = \frac{1}{r-l+1}\left\{\sum_{\substack{i=i+2\\i=0}}^{R_f-L_f-1} g_{i+L_f f}(h_{1,1,f})^* + (g_{i+1+L_f f})^* h_{2,1,f} + \right.$$

$$\left. \sum_{\substack{i=i+2\\i=0}}^{R_f-L_f-1} (g_{i+1+L_f f})^* h_{2,1,f} + g_{i+1+L_f f}(h_{1,1,f})^* \right\} \quad (3)$$

where $h_{a,i,f}$ is the radio channel estimate, properly weighted if appropriate, for TPC symbol i, antenna a, and multipath delay (rake finger) f, and $g_{i,f}$ denotes despread symbol i for finger f.

Alternatively, if transmit diversity mode is not used, such as when only one antenna is used to transmit TPC commands to the mobile user terminal, the decision statistics can be determined according to:

$$d_{f,b} = \frac{1}{r-l+1}\sum_{\substack{i=i+1\\l=0}}^{R_f-L_f} g_{i+L_f,f} h_{i+L_f,f} \quad (4)$$

In equations (3) and (4), the constants $L_f$, $R_f$ indicate which despread data from the rake fingers are processed, l and r indicate which combined data to use, r−l+1 is the number of TPC commands transmitted (e.g. 1, 2, 4, or 8). In the following $F_b$,b=1, . . . , B, indicate the set of fingers of the rake used to communicate with a base station b, and B is the total number of base stations.

The decision statistics, determined by either equation (3) or (4), are summed for each of the base stations in communication with the mobile user terminal to provide a combined TPC symbol (block 505) according to:

$$s_b = \sum_{f \in F_b} d_{f,b} \quad (5)$$

In some embodiments according to the present invention, the TPC symbols can be further adjusted using frequency error information (bock 510), for example, according to:

$$s_b' = s_b \cdot \exp(j \cdot const \cdot e_{freq,b}) \quad (6)$$

where $e_{freq,b}$ is the frequency error between the mobile user terminal and base station b. It will be understood that "const" in Equation (6) can be based on, for example, when the propagation channel estimates were computed and when they are applied.

In still other embodiments according to the present invention, the TPC symbols can be adjusted for frequency errors, for example, by combining equations (5) and (6), that is blocks 505 and 510, into one expression:

$$s_b = \sum_{f \in F_b} d_{f,b} \cdot \exp(j \cdot const \cdot e_{freq,b,f}) \quad (7)$$

where $e_{freq,b,f}$ is the frequency error between the mobile user terminal and base station b for rake finger f. It will be understood that, when using the frequency compensation according to equations (6) or (7) as set forth in embodiments according to the present invention above, it is beneficial to use symmetric decision regions, i.e., $k_1 = k_2 = k_3 = k_4 = 1/\sqrt{2}$.

In some embodiments according to the present invention, the frequency error information can be provided in the Automatic Frequency Control (AFC) block associated with the mobile user terminal which can be used to rotate the TPC symbol within the symbol space. In some embodiments according to the present invention, the frequency error information can be different for each of the base stations in communication with the mobile user terminal. In some embodiments according to the present invention, the frequency error information can be an average frequency error between all or some of the base stations and the mobile user terminal.

The distance in the IQ coordinate system between the TPC symbols for each of the base stations and the border separating the decision regions of the symbol space is determined (block 515). In some embodiments according to the present invention the distances, $d_1$ and $d_2$, to each of the lines shown in FIG. 3 (which define the first and second asymmetric decision regions) can be determined according to:

$$d_1 = k_1 Re(s_b) + k_2 Im(s_b)$$

$$d_2 = k_3 Re(s_b) + k_4 Im(s_b) \quad (8)$$

where $Re(s_b)$ and $Im(s_b)$ denote the real and imaginary components of the symbol $s_b$ respectively and where, as before, the coefficients $k_i$ are positive values such that $k_1^2 + k_2^2 \approx 1$ and $k_3^2 + k_4^2 \approx 1$. If $d_1$ and $d_2$ are both less than zero the signed distance can be determined according to:

$$w_b = -\min(|d_1|, |d_2|) \quad (9)$$

Otherwise, if either $d_1$ or $d_2$ is greater than or equal to zero, the signed distance can be determined according to:

$$w_b = \max(d_1, d_2) \quad (10)$$

The TPC symbol can be interpreted as a command to increase mobile user terminal transmit power if $$\min_{1 \le b \le B}(w_b)$$

is greater than an upper threshold distance value (block 520). If $$\min_{1 \le b \le B}(w_b)$$

is less than a lower threshold distance value, the TPC symbol can be interpreted as a command to decrease the transmit power of the mobile user terminal (block 525).

If, however, only one base station is used to transmit TPC commands to the mobile user terminal the TPC symbol may be given by the sign of $s_b$ determined by equation (5).

In other embodiments according to the present invention, transmitted power control commands can be determined at a receiver during soft handover mode in a wideband code division multiple access communications system by combining a first determination of a combined power control command received from a plurality of transmitters with a second determination of the combined power control command received from the plurality of transmitters to provide a combined power control command.

In some embodiments according to the present invention outlined above, different weights can be given to different approaches to determining TPC commands. In particular, one approach may include a bias towards interpreting a TPC command as a TPC power decrease command while another approach may include a bias towards interpreting a TPC command as a TPC power increase command. In some embodiments, the different approaches can be combined with one another and, moreover, the different approaches may have different weightings when combined with one another.

In some embodiments according to the present invention, two different approaches to combining the soft decision variables in Equation (4) can be considered first and second determinations of combined power control commands that can be expressed as:

$$TPC = \text{Sign}\left(\min_{b=1,\ldots,B}(\hat{u}_b)\right) \quad (11)$$

and $$TPC = \text{Sign}\left(\sum_{b=1}^{B} \hat{u}_b\right) \quad (12)$$

where $\hat{u}_b$ corresponds to either $s_b$ or $w_b$ depending on the situation, sign denotes the sign function (i.e., sign(x)=1 if x>=0 and sign(x)=−1 if x<0) and where equation (11) has already been introduced in the description above. TPC=−1 means that the mobile user terminal has determined that a TPC power decrease command was received and TPC=+1 means that the mobile user terminal has determined that a TPC power increase command was received.

The approach given by Equation 11 can be the first determination of the combined power control command which can provide a bias towards interpreting TPC commands as TPC power decrease commands. This approach might be considered a cautious strategy because it prioritizes (or has a bias towards) TPC power decrease commands because, by itself, this approach can incur a risk that the mobile user terminal may go into a quiet state as discussed above. This may be especially true if the number of base stations in the active radio set is greater than 2.

The approach given by Equation 12 can be the second determination of the power control command, which can provide a bias towards interpreting TPC commands as TPC power increase commands. This approach of prioritizing (or biasing towards) TPC power increase commands, by itself, may increase the risk of a near-far problem, i.e., where mobile user terminals having excessive transmit power may degrade the system capacity.

According to the present invention, the approaches given by Equations 11 and 14 can be combined:

$$TPC = \text{sign}\left\{(1-\alpha)\min_{1\le b\le B}(\hat{u}_b) + \alpha\sum_{b=1}^{B}\hat{u}_b\right\} \quad (13)$$

to provide the combination of the first and second determinations of the combined power control commands where sign denotes the sign function α is a constant based on the number of base stations. In some embodiments according to the present invention, $0 \le \alpha \le 1$.

A proper choice of α can provide a good trade-off between the advantages and drawbacks of the separate approaches given by Equations 11 and 12. α, and the complementary (1−α), can be considered first and second scaling factors applied to the second and first determinations of the combined TPC symbols in Equation 13. Alternatively, the approaches can be combined according to:

$$TPC = \text{sign}\left\{(1-\alpha)\min_{1\le b\le B}(\hat{u}_b) + \alpha\max_{b}(\hat{u}_b)\right\} \quad (14)$$

In some embodiments according to the present invention, the value of α can be based on the number of base stations involved in the soft handover and on the SIR associated with the channels over which the mobile user terminal communicates with each base station so that:

$$\alpha = g(SIR_1, \ldots, SIR_B, B) \quad (15)$$

Therefore, in a more general form, the TPC symbol can be determined as:

$$TPC = \text{sign}\{f(\hat{u}_1, \ldots, \hat{u}_B, B, SIR_1, \ldots, SIR_B)\} \quad (16)$$

In some embodiments according to the present invention, the number of base stations in the soft handover can be known to the mobile user terminal. Furthermore, the SIR for each base station can be estimated by the mobile user terminal. Therefore, an appropriate α value can either be stored in a look-up table in the mobile user terminal or determined by the mobile user terminal "on the fly" based on the number of base stations and the SIR.

In some embodiments according to the present invention, the number of radio-paths per base station and the Power Delay Profile (PDP) for each base station can be used in the decision function:

$$TPC = \text{sign}\{f(\hat{u}_1, \ldots, \hat{u}_B, B, SIR_1, \ldots, SIR_B, N_{f1}, \ldots, N_{fB}, PDP_1, \ldots, PDP_B)\} \quad (17)$$

where $N_{fb}$, is the number of radio-paths and $PDP_b$ is the power delay profile for each base station b.

Figure 6:
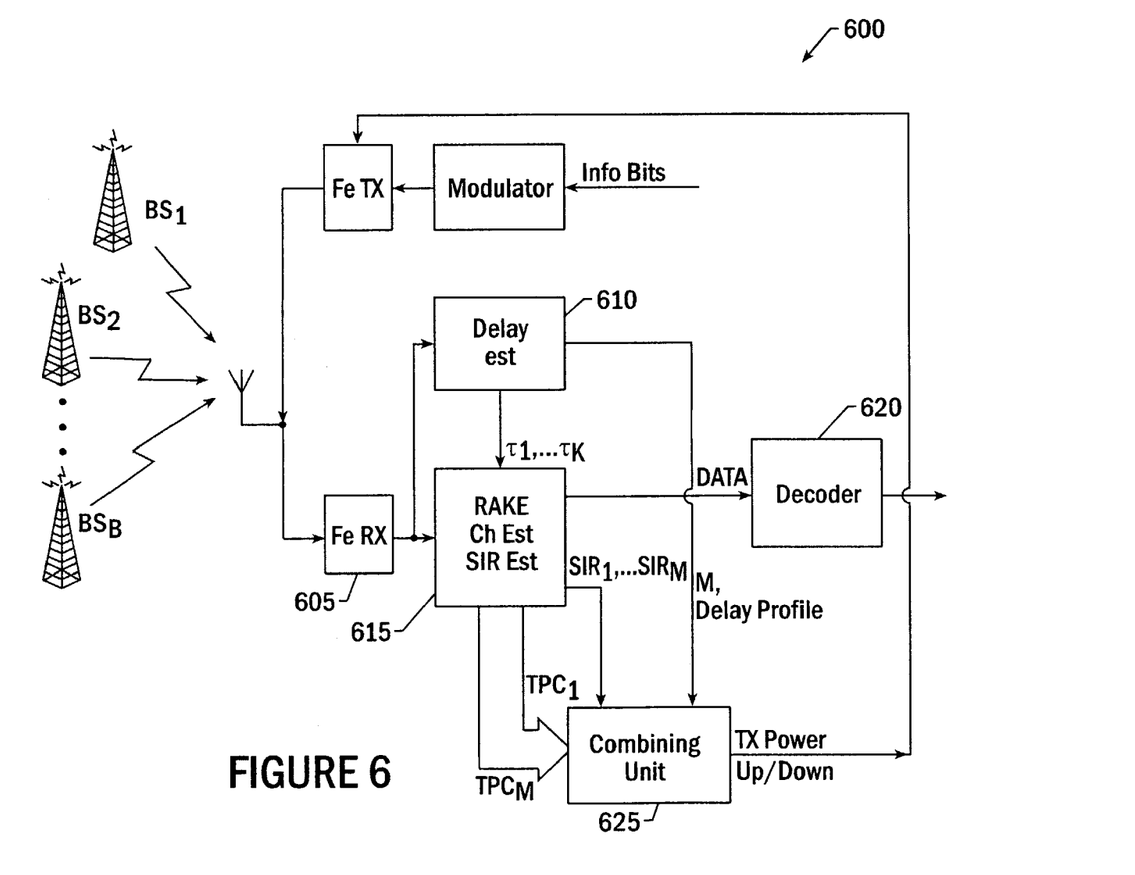
FIG. 6 is a block diagram illustrating a receiver and a transmitter included in mobile user terminal embodiments according to the present invention.

FIG. 6 is a block diagram that illustrates embodiments according to the present invention. It will be understood that the mobile user terminal 600 is operating in soft handover mode with B base stations (BS1–BSB) according to, for example, the 3CPP specification. In soft handover, the received signal, including the signals from BS1–BSB, is down-converted and sampled to a digital baseband signal in the front-end receiver circuit RX 605. The received signal is provided to a delay estimation circuit 610 that estimates the PDP for each BS on a regular basis.

The output from the delay estimator circuit 610 is a delay $\tau_k$, for the K strongest radio-paths. It is possible that one or more of the base stations (BS1–BSB) are momentarily weak, implying that only M (i.e., less than B) base stations base stations are represented by the K strongest radio-paths which is also output from the delay estimator circuit 610. Delay information is provided to the RAKE receiver circuit 615, which de-spreads the received signal and estimates the radio channel and SIR for each radio-path. Also a Maximum Ratio Combining (MRC) of the data can be performed by the Rake and provided to a decoder circuit 620 for further processing.

The $F_b$ fingers from each of the base stations b are combined using, for example MRC, according to Equation 4 and the respective SIRs per base station are provided to a combining circuit 625 that combines the soft values for each base station. The operation of the combining circuit 625 can depend on the SIR distribution over the base stations, the PDP per base station, and also on B and M. Combining according to embodiments of the present invention are described, for example, in reference to Equations 13–17.

Several examples of determinations of a scaling factor $\alpha$ are provided hereinbelow. It will be understood that the following are exemplary values and will not limit the scope of the present invention. Using the combination according to Equation 16 $\alpha$ can be chosen as follows:

In some embodiments according to the present invention, if the SIR value for each BS in the active radio link set is approximately the same, for example within 40% of some maximum SIR for all base stations, $\alpha$ can be selected to be about 0.3 where B and M are in a range of 2 to 3. In other embodiments according to the present invention, $\alpha$ can be selected to be about 0.4 where B and M are greater than 3.

In some embodiments according to the present invention, if one base station has an SIR-value that is less than 40% of a maximum SIR for all base stations (where B is in a range of 2 to 3) or if two base stations have SIR-values that are less than 40% of the maximum SIR (where B is in a range of 4 to 6) $\alpha$ can be selected to be about 0.25 where B=2,3. In other embodiments according to the present invention, $\alpha$ can be selected to be about 0.3 where B is greater than 3.

In some embodiments according to the present invention, if most of the base stations have an SIR-value that is less than 40% of the maximum SIR value $\alpha$ can be selected to be about 0.2 where B is in a range of 2 to 3. In some embodiments according to the present invention, $\alpha$ can be selected to be about 0.2 where B is greater than 3.0.

While the present invention has been described in connection with description of the preferred embodiment and drawings thereof, it is capable of various changes and modifications without departing from the spirit and scope of the invention.

The invention claimed is:

1. A method of determining transmitted power control commands at a receiver, the method comprising the steps of:
    receiving a transmitted power control command at the receiver, said command providing a received symbol;
    defining a first decision region of a symbol space associated with the received power control command at the receiver and a second decision region of the symbol space associated with the received power control command at the receiver, the first and second regions being asymmetric with one another;
    determining whether the received symbol maps to the first decision region or to the second decision region;
    interpreting the received symbol as a first type of power control command if the received symbol maps to the first decision region; and
    interpreting the received symbol as a second type of power control command if the received symbol maps to the second decision region.

2. A method according to claim 1 further comprising the step of:
    redefining the first and second asymmetric decision regions of the symbol space based on at least one parameter selected from a group consisting of:
    a number of transmitters used to transmit a command to the receiver,
    a velocity associated with the receiver,
    an interference associated with the receiver,
    a frequency error between at least one of the transmitters and the receiver,
    a pilot sequence received at the receiver, and
    a parameter associated with transmission power that affects reliability of power control commands.

3. A method according to claim 1, wherein the receiver comprises a spread spectrum mobile user terminal, and a transmitter used to transmit the power control command to the spread spectrum mobile user terminal comprises a base station, wherein the first type of power control command comprises a transmission power control (TPC) command from the base station to increase a transmit power of the spread spectrum mobile user terminal and the second type of power control command comprises a TPC command from the base station to decrease the transmit power of the spread spectrum mobile user terminal.

4. A method according to claim 3 wherein the TPC commands are included in a dedicated physical channel associated with the mobile user terminal operating in a wideband code division multiple access communications system.

5. A method according to claim 1 wherein the step of receiving further comprises receiving the transmitted power control command using frequency error information to compensate for a difference in a transmitter frequency used to transmit the power control command and a receiver frequency.

6. A method according to claim 5 wherein the frequency error information comprises a frequency error estimate based on information included in an Automatic Frequency Control (AFC) block of a communication channel received by the receiver.

7. A method according to claim 5 wherein a plurality of transmitters transmit at least one power control command to the receiver, wherein the step of receiving further comprises receiving the at least one power control command using a plurality of frequency error information associated with the plurality of transmitters.

8. A method according to claim 5 wherein a plurality of transmitters transmit at least one power control command to the receiver, wherein the frequency error information comprises an average of frequency error information associated with the plurality of transmitters.

9. A method according to claim 1:
    wherein the symbol space comprises a representation of an IQ coordinate system; and
    wherein the first decision region includes more than one half of the IQ coordinate system and the second decision region includes less than one half.

10. A method of determining transmitted power control commands at a receiver, the method comprising the steps of:
    receiving a transmitted power control command at the receiver;
    defining a first decision region of a symbol space associated with the received power control command as a first type of power control command;
    defining a second decision region of the symbol space associated with the received power control command as a second type of power control command, the first and second regions being asymmetric with one another;

wherein the first decision region includes a greater portion of the symbol space than the second decision region to provide a bias to interpret the received power control command as the first type of power control command rather than the second type of power control command.

11. A receiver comprising:

a circuit configured to receive transmitted power control commands and provide received symbols for mapping to a symbol space defined to include a first decision region of the symbol space associated with a first power control command received at the receiver and a second decision region of the symbol space associated with a second power control command received at the receiver, the first and second regions being asymmetric with one another;

wherein the circuit is further configured to determine whether a received symbol maps to the first decision region or to the second decision region and to interpret the received symbol as the first power control command if the received symbol maps to the first decision region and to interpret the received symbol as the second power control command if the received symbol maps to the second decision region.

12. A receiver according to claim 11 wherein the circuit is further configured to redefine the first and second asymmetric regions of the symbol space based on at least one parameter selected from a group consisting of:

a number of transmitters used to transmit the power control command to the receiver, a velocity associated with the receiver, an interference associated with the receiver, a frequency error between at east one of the transmitters and the receiver, a pilot sequence received at the receiver, and a parameter associated with transmission power that affects reliability of power control commands.

13. A receiver according to claim 11 wherein the first decision region includes a greater portion of the symbol space than the second decision region to provide a bias to interpret the received symbol as the first power control command rather than the second power control command.

14. A receiver according to claim 11, wherein the receiver comprises a spread spectrum mobile user terminal, and a transmitter used to transmit the command to the spread spectrum mobile user terminal comprises a base station, wherein the first power control command comprises a first transmission power control (TPC) command from the base station to increase a transmit power of the spread spectrum mobile user terminal and the second power control command comprises a second TPC command from the base station to decrease the transmit power of the spread spectrum mobile user terminal.

15. A receiver according to claim 14 wherein the TPC command is included in a dedicated physical channel associated with the spread spectrum mobile user terminal operating in a wideband code division multiple access communications system.

16. A receiver according to claim 11 wherein the circuit is further configured to receive the transmitted power control command using frequency error information to compensate for a difference in a transmitter frequency used to transmit the power control command and a receiver frequency.

17. A receiver according to claim 16 wherein the frequency error information comprises a frequency error estimate based on information included in an Automatic Frequency Control (AFC) block of a communication channel received by the receiver.

18. A receiver according to claim 16 wherein a plurality of transmitters transmit at least one power control command to the receiver, wherein the circuit is further configured to receive the at least one power control command using a plurality of frequency error information associated with the plurality of transmitters.

19. A receiver according to claim 16 wherein a plurality of transmitters transmit at least one power control command to the receiver, wherein the frequency error information comprises an average of frequency error information associated with the plurality of transmitters.

20. A receiver according to claim 11:

wherein the symbol space comprises a representation of an IQ coordinate system; and wherein the first decision region includes more than one half of the IQ coordinate system and the second decision region includes less than one half.

21. A computer program product for determining transmitted power control commands at a receiver, said computer program product comprising:

a computer readable storage medium having computer-readable program code means embodied in said medium, the computer-readable program code means comprising computer-readable program code means for defining a first decision region of a symbol space associated with a first power control command at the receiver and a second decision region of the symbol space associated with a second power control command at the receiver, the first and second regions being asymmetric with one another;

computer-readable program code means for receiving a transmitted power control command at a receiver to provide a received symbol;

computer-readable program code means for determining whether the received symbol maps to the first decision region or to the second decision region;

computer-readable program code means for interpreting the received symbol as the first power control command if the received symbol maps to the first decision region; and computer-readable program code means for interpreting the received symbol as the second power control command if the received symbol maps to the second decision region.

22. A computer program product according to claim 21 further comprising:

computer-readable program code means for redefining the first and second asymmetric regions of the symbol space based on at least one parameter selected from a group consisting of:

a number of transmitters used to transmit a power control command to the receiver, a velocity associated with the receiver, an interference associated with the receiver, a frequency error between at least one of the transmitters and the receiver, a pilot sequence received at the receiver, and a parameter associated with transmission power that affects reliability of power control commands.

23. A computer program product according to claim 21 wherein the first decision region includes a greater portion of the symbol space than the second decision region to provide a bias to interpret the received symbol as the first power control command rather than the second power control command.

24. A computer program product according to claim 21, wherein the receiver comprises a spread spectrum mobile user terminal, and a transmitter used to transmit the power control command to the spread spectrum mobile user terminal comprises a base station, wherein the first power control command comprises a first transmission power control (TPC) command from the base station to increase a transmit power of the spread spectrum mobile user terminal and the second command comprises a second TPG command from the base station to decrease the transmit power of the spread spectrum mobile user terminal.

25. A computer program product according to claim 24 wherein the TPC commands are included in a dedicated physical channel associated with the spread spectrum mobile user terminal operating in a wideband code division multiple access communications system.

26. A computer program product according to claim 21 wherein the computer-readable program code means for receiving further comprises computer-readable program code means for receiving the transmitted power control command using frequency error information to compensate for a difference in a transmitter frequency used to transmit the power control command and a receiver frequency.

27. A method of determining a transmitted power control command at a receiver in a mobile user terminal during soft handover mode in a wideband code division multiple access communications system, the method comprising the steps of:
   defining a first decision region of a symbol space associated with a first power control command received from a first transmitter and a second decision region of the symbol space associated with a second power control command received from a second transmitter, the first and second regions being asymmetric with one another;
   determining first and second received symbols associated respectively with the first and second power control commands;
   determining for each symbol, a distance of the symbol from a border separating the first and second decision regions of the symbol space;
   combining the distances of the first and second symbols to provide a combined symbol distance from the border;
   interpreting a combined power control command as a first type of command if the combined symbol distance marks a point within the first decision region; and
   interpreting the combined power control command as a second type of command if the combined symbol distance marks a point within the second decision region.

28. A method according to claim 27:
   wherein the first decision region includes a greater portion of the symbol space than the second decision region to provide a bias to interpret the received symbol as the first power control command rather than the second power control command.

29. A method according to claim 28 wherein the step of defining the first and second decision regions includes scaling the regions based on at least one parameter selected from a group consisting of:
   a number of transmitters in communication with the receiver during the soft handover,
   a Signal to Interference Ratio (SIR) associated with a communications channel over which the receiver communicates during soft handover,
   a number of radio paths used to communicate with the receiver, and
   a Power Delay Profile (PDP) associated with the communications channel.

30. A method of determining transmitted power control commands at a receiver during soft handover mode in a wideband code division multiple access communications system, the method comprising the steps of:
   defining a first decision region of a symbol space associated with a first power control command at the receiver and a second decision region of the symbol space associated with a second power control command at the receiver, the first and second regions being asymmetric with one another;
   determining a first symbol of a first power control command received from a first transmitter;
   determining a second symbol of a second power control command received from a second transmitter;
   combining a position of the first symbol in symbol space with a position of the second symbol in symbol space to provide a combined position in symbol space;
   determining whether the combined position is in the first decision region of the symbol space or in the second decision region of the symbol space;
   determining that a combined power control command is a first type of command if the combined position is in the first decision region; and
   determining that the combined power control command is a second type of command if the combined position is in the second decision region.

31. A method according to claim 30, wherein the step of defining the first and second decision regions includes scaling the regions based on at least one parameter selected from a group consisting of:
   a number of transmitters in communication with the receiver during the soft handover, and
   a Signal to Interference Ratio (SIR) associated with a communications channel over which the receiver communicates during soft handover.

32. A method according to claim 31 further comprising the step of combining power control commands received from a plurality of transmitters based on a Power Delay Profile (PDP) associated with the communications channel.

33. A method of determining transmitted power control commands at a receiver in a mobile user terminal during soft handover mode in a wideband code division multiple access communications system, the method comprising the steps of:
   receiving respective power control commands transmitted from a plurality of transmitters;
   determining a received symbol for each respective power control command;
   determining respective distances from each symbol to a boundary between a first decision region of a symbol space and an asymmetrically defined second decision region of the symbol space; and
   combining the respective distances to provide a combined position in symbol space;
   determining that a combined power control command is a first type of command if the combined position is in the first decision region; and determining that the combined power control command is a second type of command if the combined position is in the second decision region.

34. A method according to claim 33 further comprising:
comparing the combined position in symbol space to a threshold distance from the boundary;
increasing transmit power of the mobile user terminal if the combined position in symbol space is a greater distance from the boundary than the threshold distance; and
decreasing transmit power of the mobile user terminal if the combined position in symbol space is a lesser distance from the boundary than the threshold distance.

* * * * *